United States Patent
Yang et al.

(10) Patent No.: US 11,780,491 B2
(45) Date of Patent: Oct. 10, 2023

(54) ELECTRIC RECIRCULATING BALL POWER STEERING SYSTEM

(71) Applicant: Steering Solutions IP Holding Corporation, Saginaw, MI (US)

(72) Inventors: Kun Yang, Jiangsu (CN); Peter D. Schmitt, Farmington Hills, MI (US); Jeffrey E. Beyerlein, Birch Run, MI (US)

(73) Assignee: Steering Solutions IP Holding Corporation, Saginaw, MI (US)

(*) Notice: Subject to any disclaimer, the term of this patent is extended or adjusted under 35 U.S.C. 154(b) by 271 days.

(21) Appl. No.: 16/694,839

(22) Filed: Nov. 25, 2019

(65) Prior Publication Data

US 2021/0155286 A1 May 27, 2021

(51) Int. Cl.
*B62D 5/04* (2006.01)
*B62D 7/16* (2006.01)
*B62D 3/04* (2006.01)

(52) U.S. Cl.
CPC .............. *B62D 5/0463* (2013.01); *B62D 3/04* (2013.01); *B62D 5/0415* (2013.01); *B62D 7/166* (2013.01)

(58) Field of Classification Search
CPC ...... B62D 5/0463; B62D 3/04; B62D 5/0415; B62D 7/166
See application file for complete search history.

(56) References Cited

U.S. PATENT DOCUMENTS

| 4,986,381 | A | * | 1/1991 | Morishita | ............ B62D 5/0412 180/446 |
| 6,543,569 | B1 | * | 4/2003 | Shimizu | ................ B21K 1/767 180/444 |
| 8,567,554 | B2 | * | 10/2013 | Zaloga | ................. B62D 5/0454 180/446 |
| 2001/0035310 | A1 | * | 11/2001 | Tsuboi | ...................... F16D 3/68 180/444 |
| 2006/0175123 | A1 | * | 8/2006 | Yabe | ....................... F16H 55/06 180/444 |
| 2017/0190351 | A1 | * | 7/2017 | Kuo | ..................... B62D 5/0415 |

FOREIGN PATENT DOCUMENTS

| CN | 109955896 | A | * | 7/2019 | .............. B62D 3/04 |
| CN | 109955896 | A |   | 7/2019 | |
| DE | 102008043792 | A1 | * | 5/2010 | ............. F16H 55/24 |
| EP | 2805871 | A2 | * | 11/2014 | ........... B62D 5/0463 |
| KR | 20200094359 | A | * | 8/2020 | |
| WO | WO-2011058115 | A2 | * | 5/2011 | ........... B62D 5/0421 |

OTHER PUBLICATIONS

English Translation of First Office Action regarding corresponding CN App. No. 202011335880; dated Aug. 19, 2022.

* cited by examiner

*Primary Examiner* — Jacob D Knutson
(74) *Attorney, Agent, or Firm* — Dickinson Wright PLLC

(57) ABSTRACT

An electric power steering system includes an electric motor including a motor output shaft. The system also includes a worm operatively coupled to the motor output shaft. The system further includes a worm gear in contact with the worm and operatively coupled to an auxiliary shaft. The system yet further includes a drive gear operatively coupled to the auxiliary shaft. The system also includes a driven gear in contact with the drive gear and operatively coupled to an input shaft to drive a manual recirculating ball steering gear.

11 Claims, 6 Drawing Sheets

ELECTRIC RECIRCULATING BALL POWER STEERING SYSTEM

FIELD OF THE INVENTION

This disclosure generally relates to steering systems and, more particularly to a high output electric recirculating ball power steering system.

BACKGROUND

Many vehicles require a recirculating ball steering gear, either due to vehicle suspension and steering architecture or required gear output. Most recirculating ball steering gears use hydraulic power to provide the desired assist.

The available output steering torque from an electric recirculating ball steering gear is a function of the motor torque multiplied by the assist mechanism gear ratio, summed with the driver input torque, and finally multiplied by the gear ratio of the recirculating ball steering gear. Prior attempts to use column electric power steering (CEPS) assist mechanisms have been marginal in terms of achieving the desired overall steering gear output, due to either too low a ratio or inadequate torque capacity for existing worm-worm gear sets.

SUMMARY

According to one aspect of the disclosure, an electric power steering system includes an electric motor including a motor output shaft. The system also includes a worm operatively coupled to the motor output shaft. The system further includes a worm gear in contact with the worm and operatively coupled to an auxiliary shaft. The system yet further includes a drive gear operatively coupled to the auxiliary shaft. The system also includes a driven gear in contact with the drive gear and operatively coupled to an input shaft to drive a manual recirculating ball steering gear.

According to another aspect of the disclosure, an electric power steering system includes an electric motor. The system also includes a first gear arrangement driven by the electric motor. The system further includes a second gear arrangement driven by the first gear arrangement, the second gear arrangement operatively coupled to an input shaft to drive a manual recirculating ball steering gear.

According to another aspect of the disclosure, a method of providing an electric power assist to a steering system is provided. The method includes detecting a torque input with a torque sensor. The method also includes transmitting the torque input detected to a controller. The method further includes determining a required assist torque at least partially based on the torque input. The method yet further includes sending a command to an electric motor. The method also includes outputting torque with the motor to drive a worm and worm gear arrangement, the worm and worm gear arrangement driving an auxiliary shaft. The method further includes rotating the auxiliary shaft to drive a drive gear. The method yet further includes transmitting torque to a driven gear with the drive gear. The method also includes driving an input.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the present disclosure will be described with reference to specific embodiments, it is to be understood that the disclosed embodiments are merely illustrative of the present disclosure that may be embodied in various and alternative forms. Various elements of the disclosed embodiments may be combined or omitted to form further embodiments of the present disclosure. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
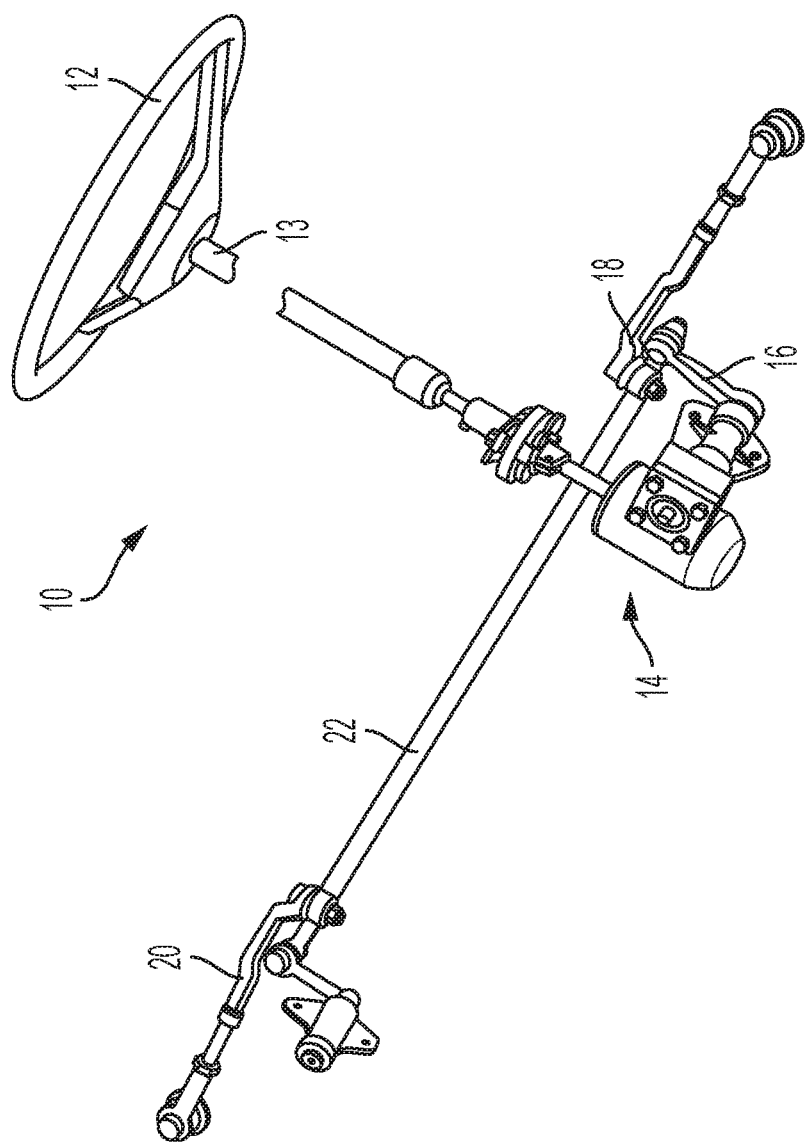
FIG. 1 is a schematic illustration of a steering system.

FIG. 1 illustrates a portion of a steering column assembly that is generally referenced with numeral 10. The steering column assembly 10 includes a steering input device, such as the illustrated steering wheel 12. The steering wheel 12 is operatively coupled to a steering shaft 13 that is rotatable. The magnitude and direction of the torque applied by the driver is detected by a torque sensor and transmitted to an electric power steering (EPS) system 14. As appreciated from the disclosure herein, the EPS system 14 includes a manual recirculating ball steering gear that outputs a torque to a Pitman arm 16 that is operatively coupled to a tie rod 18 that is mechanically coupled to a second tie rod 20 with a center link 22. The tie rods 18, 20 are each operatively coupled to one of the road wheels (not shown) of the vehicle.

The EPS system 14 provides an electric solution (as opposed to hydraulic) for the recirculating ball steering gear. The gear arrangements of the EPS system 14 disclosed herein increase the available torque assist that is available with an electric motor without requiring significantly more electric power from the electric motor.

Figure 2:
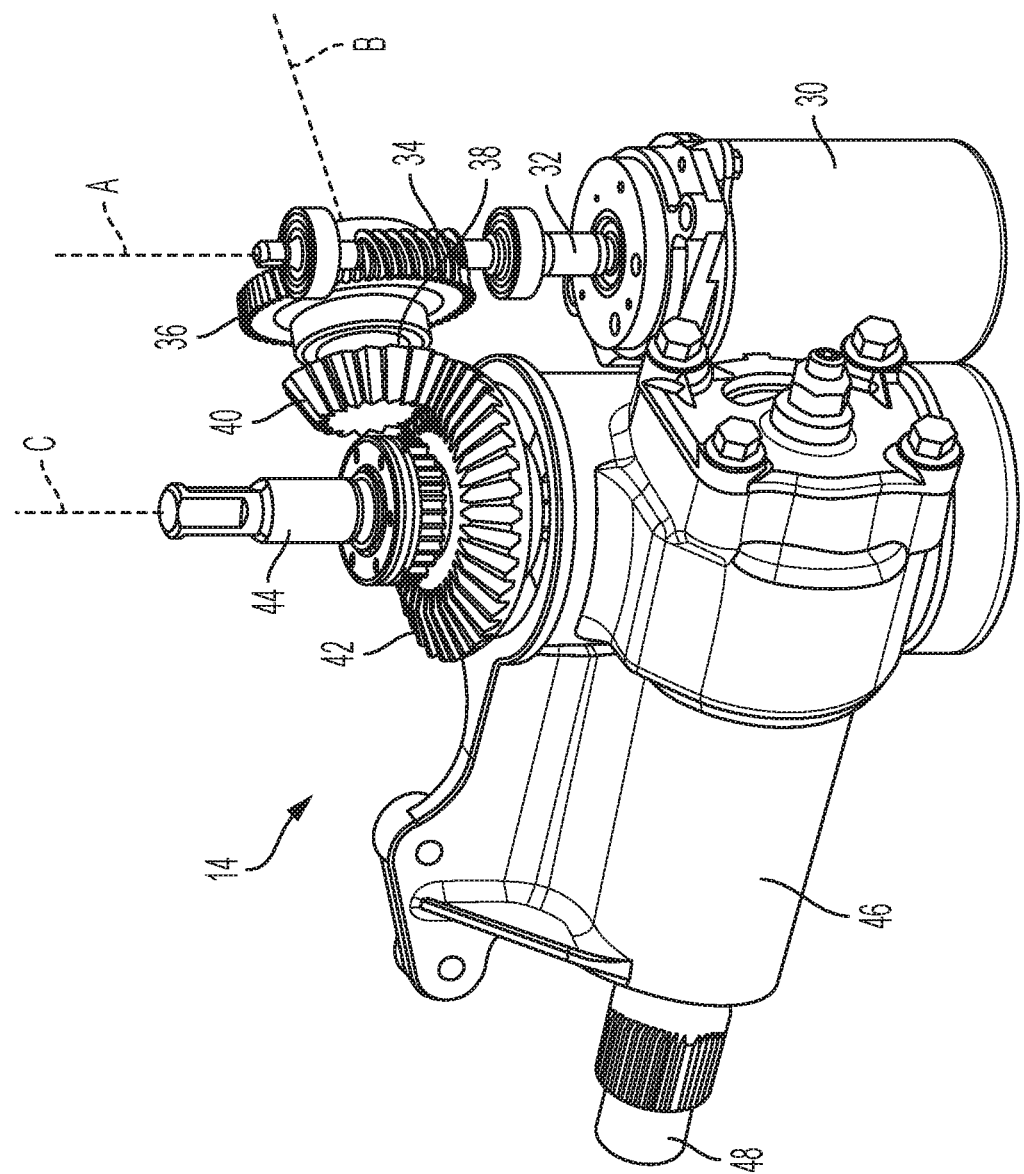
FIG. 2 is a perspective view of an electric recirculating ball power steering system according to one aspect of the disclosure.
Figure 4:
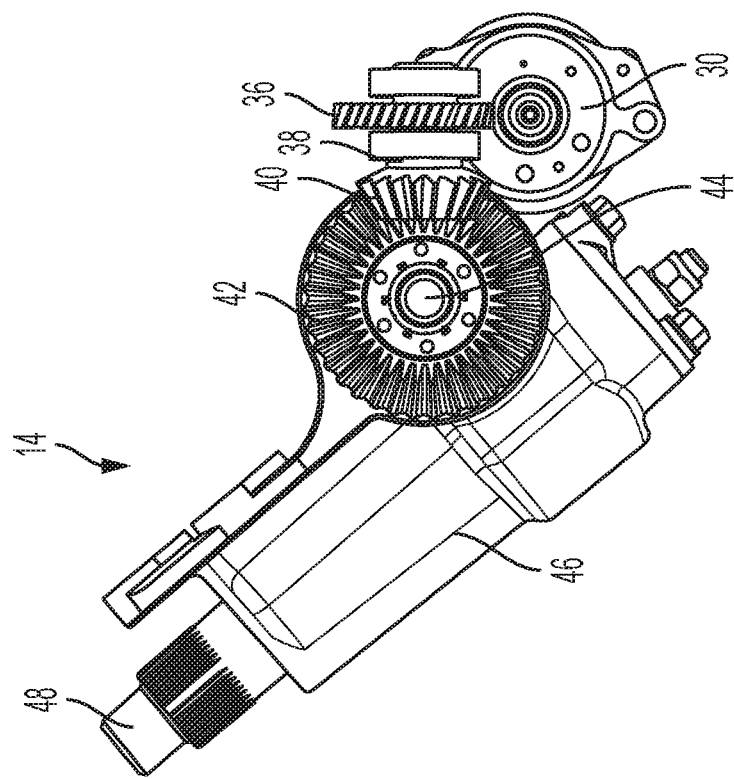
FIG. 4 is a second side elevational view of the electric recirculating ball power steering system of FIG. 2.
Figure 3:
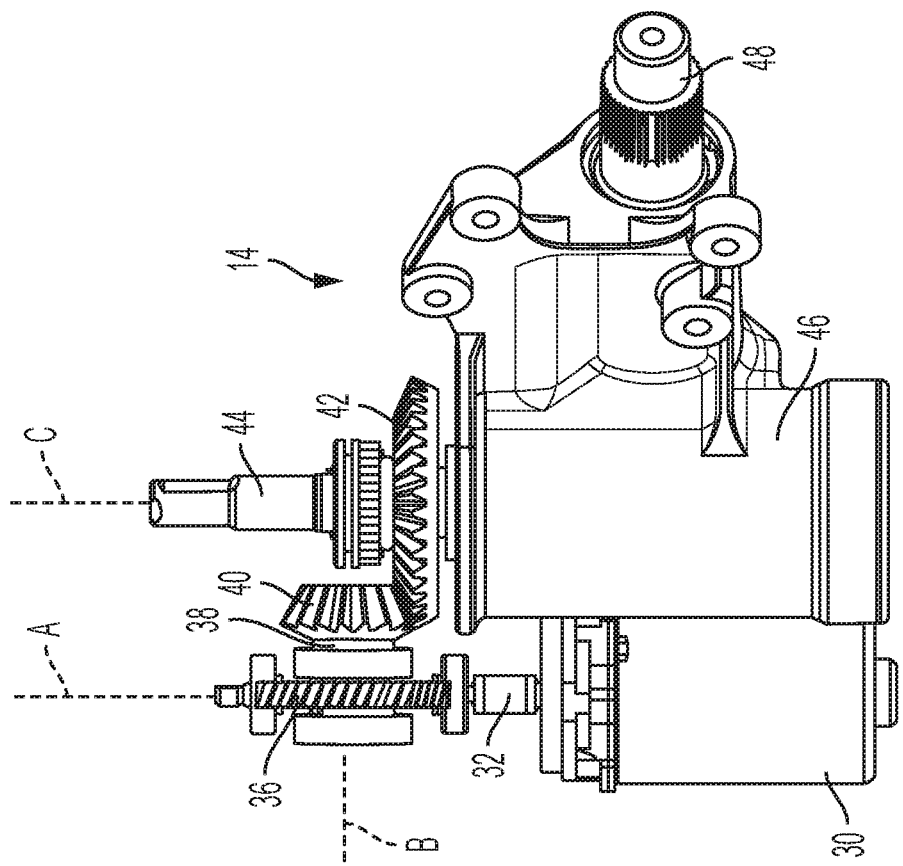
FIG. 3 is a first side elevational view of the electric recirculating ball power steering system of FIG. 2.

Referring now to FIGS. 2-4, the EPS system 14 is illustrated according to one aspect of the disclosure. The EPS system 14 includes an electric motor 30 that includes a motor output shaft 32 that is operatively coupled to a worm 34 extending along a first axis A. The worm 34 is in meshed engagement with a worm gear 36, such that rotation of the motor output shaft 32 results in rotation of the worm 34 and the worm gear 36. The worm 34 and the worm gear 36 may be referred to herein as a first gear arrangement. The first gear arrangement provides a partial multiplication of the motor output torque.

The worm gear 36 is operatively coupled to an auxiliary shaft 38 that extends along a second axis B. A drive gear 40 is operatively coupled to the auxiliary shaft 38. The drive gear 40 is in meshed engagement with a driven gear 42, such that rotation of the auxiliary shaft 38 results in rotation of the drive gear 40 and the driven gear 42. The drive gear 40 and the driven gear 42 are each bevel gears and may be referred to herein as a first bevel gear and a second bevel gear, respectively. Collectively, the drive gear 40 and the driven gear 42 may be referred to herein as a second gear arrangement. The second gear arrangement provides a second multiplication of the motor output torque.

The driven gear 42 is operatively coupled to an input shaft 44 of a manual recirculating ball steering gear that is located within a housing 46. The input shaft 44 extends along a third axis C. As shown, the first axis A and the third axis C are oriented substantially parallel to each other, while the second axis B is oriented substantially perpendicular relative to axes A and C.

The manual recirculating ball steering gear includes an output shaft 48 that is driven by the input shaft 44 for a final gear ratio multiplication. The output shaft 48 is operatively coupled to the Pitman arm 16 that provides the final steering torque that is applied to the vehicle road wheels.

Figure 5:
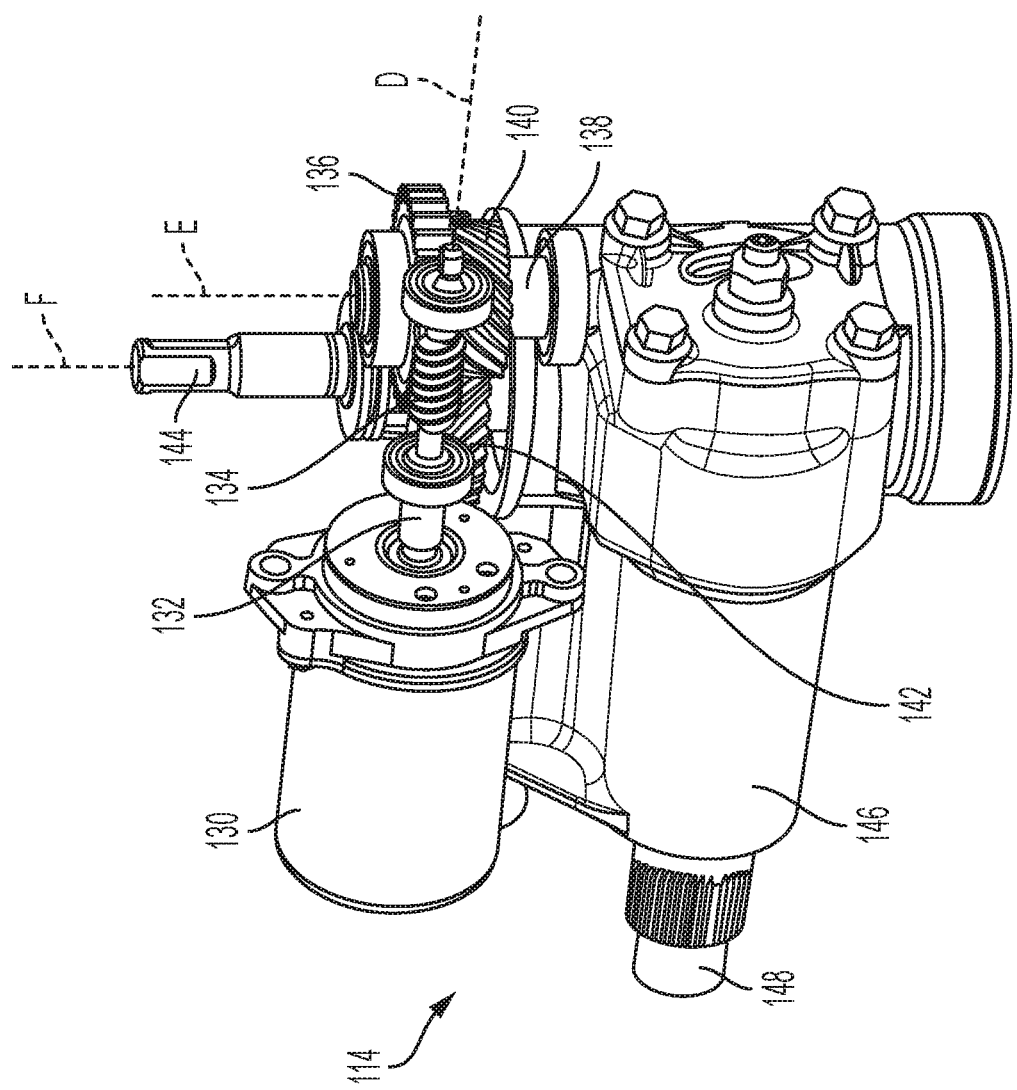
FIG. 5 is a perspective view of an electric recirculating ball power steering system according to another aspect of the disclosure.
Figure 6:
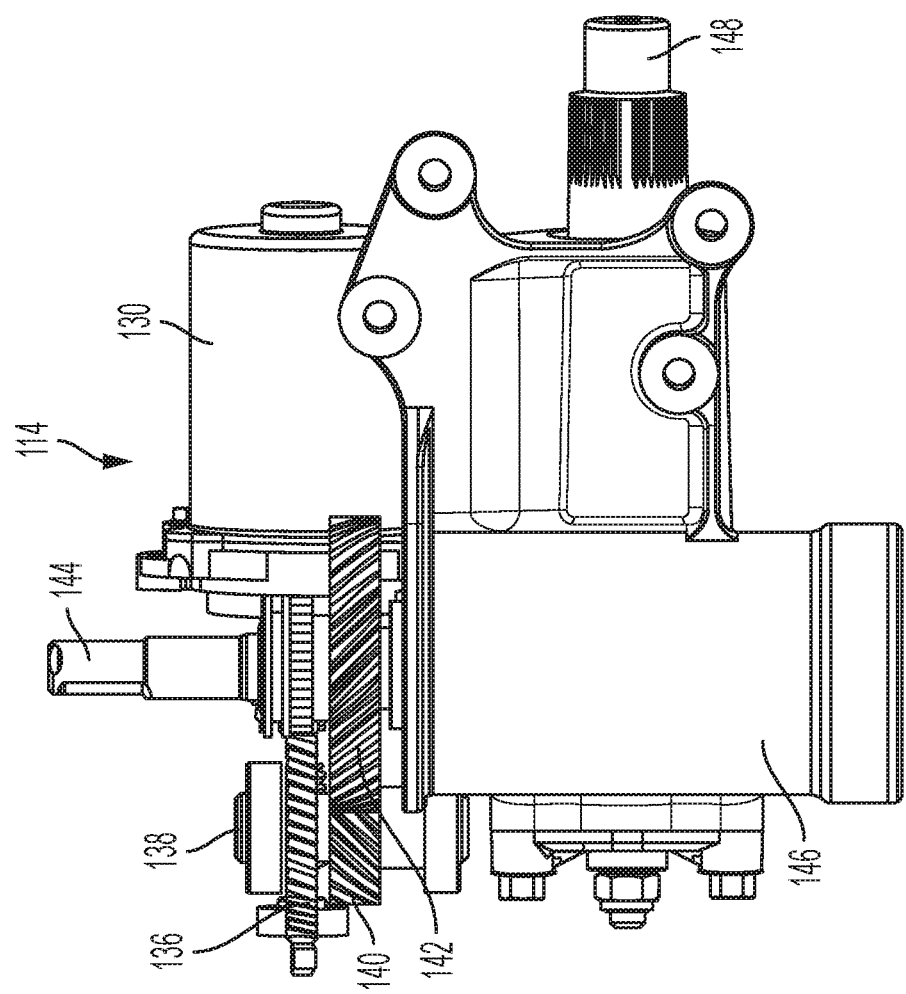
FIG. 6 is a first side elevational view of the electric recirculating ball power steering system of FIG. 5.
Figure 7:
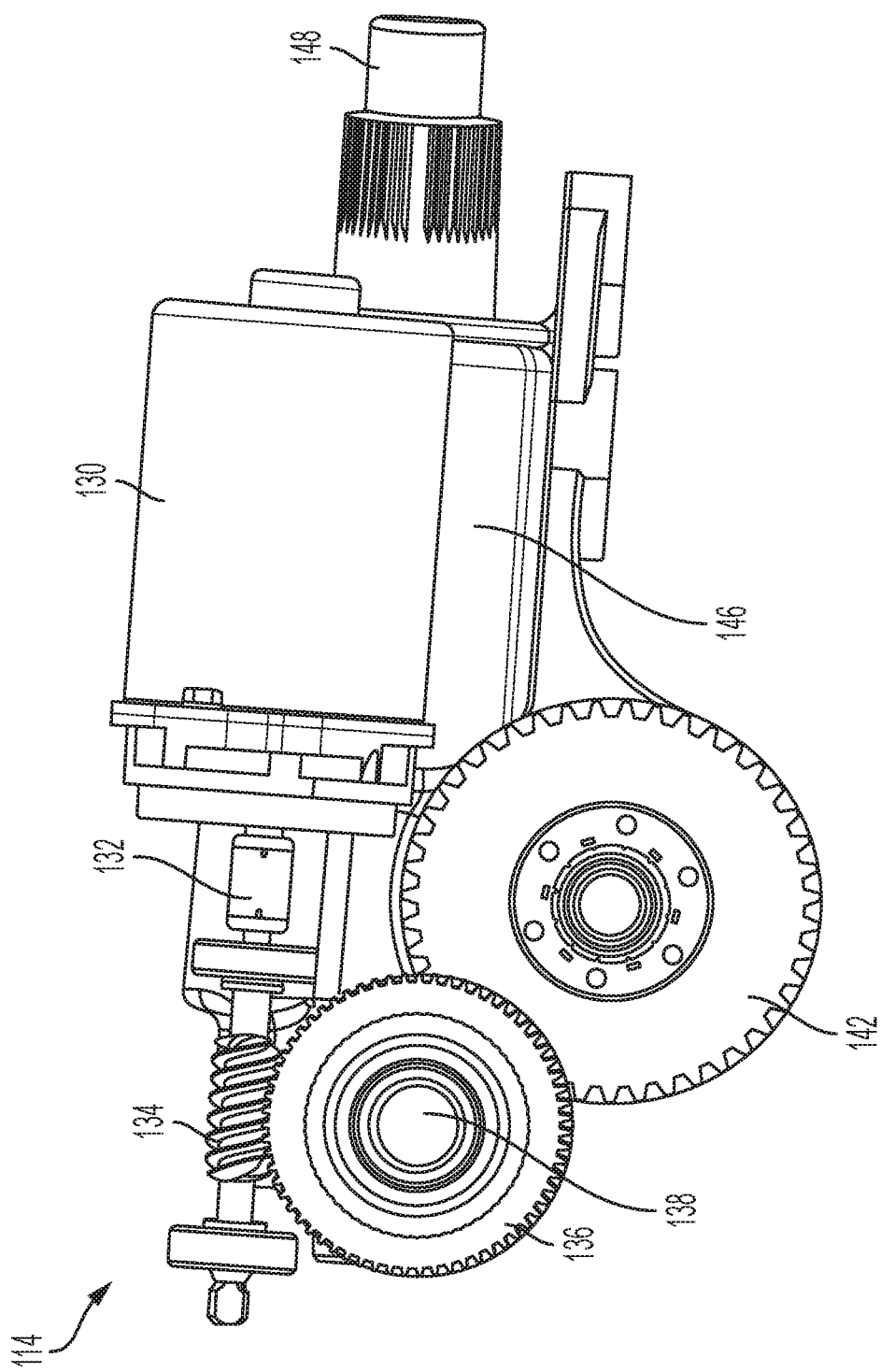
FIG. 7 is a second side elevational view of the electric recirculating ball power steering system of FIG. 5.

Referring now to FIGS. 5-7, the EPS system is illustrated according to another aspect of the disclosure and is referenced generally with numeral 114. The EPS system 114 includes an electric motor 130 that includes a motor output shaft 132 that is operatively coupled to a worm 134 extending along a first axis D. The worm 134 is in meshed engagement with a worm gear 136, such that rotation of the motor output shaft 132 results in rotation of the worm 132 and the worm gear 136. The worm 134 and the worm gear 136 may be referred to herein as a first gear arrangement. The first gear arrangement provides a partial multiplication of the motor output torque.

The worm gear 136 is operatively coupled to an auxiliary shaft 138 that extends along a second axis E. A drive gear 140 is operatively coupled to the auxiliary shaft 138. The drive gear 140 is in meshed engagement with a driven gear 142, such that rotation of the auxiliary shaft 138 results in rotation of the drive gear 140 and the driven gear 142. The drive gear 140 and the driven gear 142 form a spur gear arrangement. In some embodiments, the drive gear 140 and the driven gear 142 each have a helical teeth pattern. Collectively, the drive gear 140 and the driven gear 142 may be referred to herein as a second gear arrangement. The second gear arrangement provides a second multiplication of the motor output torque.

The driven gear 142 is operatively coupled to an input shaft 144 of a manual recirculating ball steering gear that is located within a housing 146. The input shaft 144 extends along a third axis F. As shown, the second axis E is oriented substantially parallel to the third axis F, while the first axis D is oriented substantially perpendicular to the second and third axes E and F.

The manual recirculating ball steering gear includes an output shaft 148 that is driven by the input shaft 144 for a final gear ratio multiplication. The output shaft 148 is operatively coupled to the Pitman arm 16 that provides the final steering torque that is applied to the vehicle road wheels.

The embodiments disclosed herein provide an additional, auxiliary gear arrangement (i.e., second gear arrangement) to decouple the assist torque between the assist mechanism (i.e., electric motor and first gear arrangement) and the manual recirculating ball steering gear input. As described above, the embodiments provide an electric solution for a recirculating ball steering gear. The benefits associated with such embodiments include fuel savings, simplified vehicle packaging and installation, provision of advanced EPS functions such as wheel imbalance rejection, and the ability to support advanced driver assist steering (ADAS) functions such as lane centering.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An electric power steering system comprising:
an electric motor including a motor output shaft;
a worm operatively coupled to the motor output shaft;
a worm gear in contact with the worm and operatively coupled to an auxiliary shaft;
a drive gear operatively coupled to the auxiliary shaft; and
a driven gear in contact with the drive gear and operatively coupled to an input shaft to drive a manual recirculating ball steering gear, wherein the motor output shaft and the input shaft are oriented perpendicular to each other, wherein the auxiliary shaft and the input shaft are oriented parallel to each other.

2. The electric power steering system of claim 1, wherein the drive gear and the driven gear form a spur gear arrangement.

3. The electric power steering system of claim 1, wherein the drive gear and the driven gear are helical gears.

4. The electric power steering system of claim 1, further comprising a controller in operative communication with the electric motor and a torque sensor.

5. The electric power steering system of claim 1, wherein an output shaft of the manual recirculating ball steering gear is operatively coupled to a Pitman arm, the Pitman arm operatively coupled to a tie rod to provide an assist torque to vehicle road wheels.

6. An electric power steering system comprising:
an electric motor having a motor output shaft;
a first gear arrangement driven by the electric motor; and
a second gear arrangement driven by the first gear arrangement, the second gear arrangement operatively coupled to an input shaft to drive a manual recirculating ball steering gear, wherein the motor output shaft and the input shaft are oriented perpendicular to each other, wherein the second gear arrangement comprises:
a drive gear operatively coupled to an auxiliary shaft that is driven by the first gear arrangement; and
a driven gear in contact with the drive gear and operatively coupled to the input shaft, wherein the auxiliary shaft and the input shaft are oriented parallel to each other.

7. The electric power steering system of claim 6, wherein the first gear arrangement comprises:
a worm operatively coupled to the electric motor; and
a worm gear in contact with the worm and operatively coupled to an auxiliary shaft.

8. The electric power steering system of claim 6, wherein the drive gear and the driven gear form a spur gear arrangement.

9. The electric power steering system of claim 6, wherein the drive gear and the driven gear are helical gears.

10. The electric power steering system of claim 6, further comprising a controller in operative communication with the electric motor and a torque sensor.

11. The electric power steering system of claim 6, wherein an output shaft of the manual recirculating ball steering gear is operatively coupled to a Pitman arm, the Pitman arm operatively coupled to a tie rod to provide an assist torque to vehicle road wheels.

* * * * *